Aug. 23, 1927.
E. P. GRAY
1,640,187
AUTOMOBILE HEATER COVER
Filed May 27, 1925
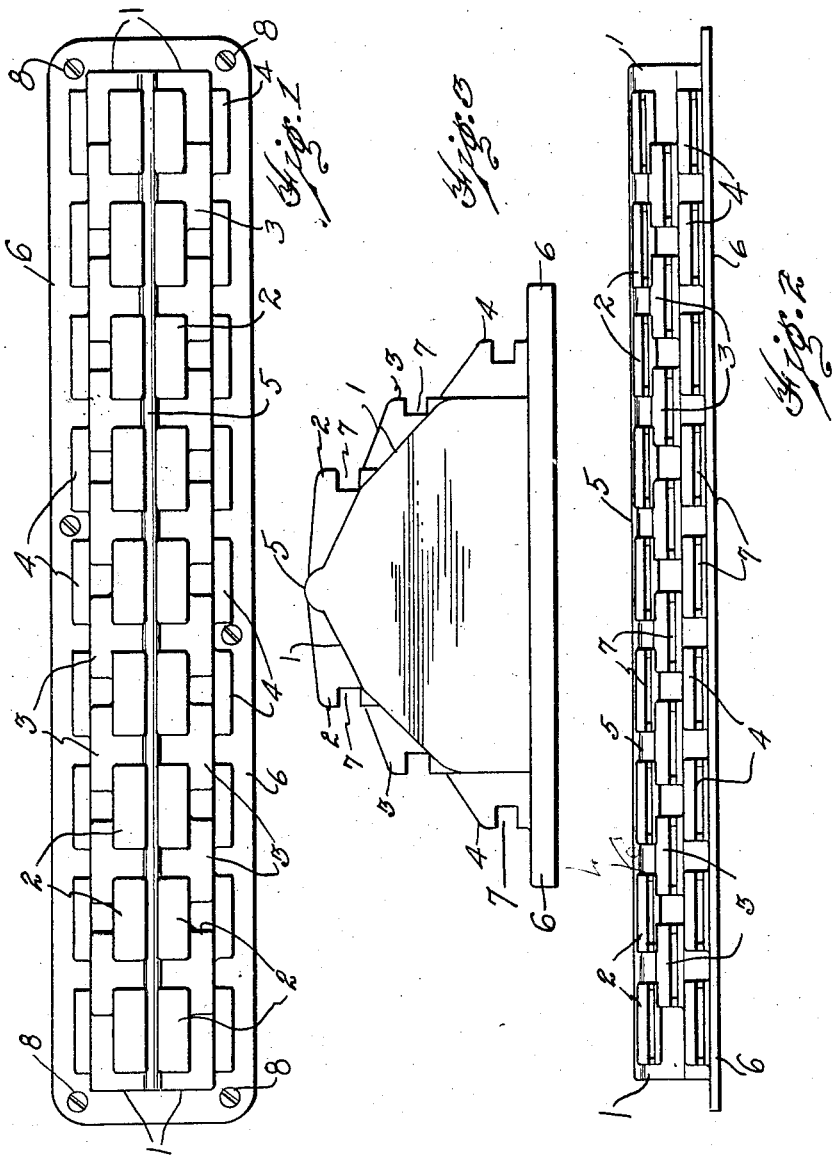
INVENTOR.
EMMET P. GRAY
BY
ATTORNEY.

Patented Aug. 23, 1927.

1,640,187

UNITED STATES PATENT OFFICE.

EMMET P. GRAY, OF DETROIT, MICHIGAN.

AUTOMOBILE HEATER COVER.

Application filed May 27, 1925. Serial No. 33,184.

This invention relates to automobile heater covers and the object of the invention is to provide a cover for an automobile heater which is provided with openings through which heated air may pass but arranged to prevent foreign matter from entering the heater.

Another object of the invention is to provide an automobile heater cover arranged to provide a foot rest for the occupants of the automobile.

A further object of the invention is to provide an automobile heater cover of low manufacturing cost and which at the same time is neat in appearance.

Another object of the invention is to provide a heater cover in which the openings through which the heat is adapted to pass may be readily cut into the cover after the cover has been formed.

These objects and the several novel features of the invention are hereinafter more fully described and claimed and the preferred form of construction by which these objects are attained is shown in the accompanying drawings in which—

Fig. 1 is a plan view of a heater cover embodying my invention.

Fig. 2 is a side elevation thereof.

Fig. 3 is an end elevation of the heater cover.

As shown in Fig. 3 the heater cover has the general conformity of the line 1 from which three rows of bosses 2, 3 and 4 are pressed out on each side which are shown more particularly in Figs. 1 and 2. The bosses in the different rows are in staggered relation and a rib 5 extends longitudinally of the top of the cover. A flange 6 extends about the bottom edge of the cover and is provided with apertures for the screws 8 by means of which the cover is attached to the floor of the automobile and covers the opening for the heater which is placed in the automobile floor beneath the cover. This heater cover is preferably formed from sheet metal but may be cast if desired. The bosses 2, 3 and 4 strengthen the cover and at the same time enhance the appearance of the cover. The heater openings 7 are cut into the bosses 2, 3 and 4 by means of a slotting saw which is moved longitudinally of the rows of bosses 2, 3 and 4 to cut the slots 7 through the vertical faces of the bosses. By this arrangement a slot 7 is cut into the vertical face of each boss which provides a multiplicity of openings through which the heat may escape from the heater. With this construction dirt or other foreign matter cannot enter the heater and as the heater pipes are thus kept free from foreign matter the efficiency of the heater is increased and at the same time the removal of foreign matter from the interior of the heater is eliminated.

In the ordinary type of heater cover a grating is usually placed over the heater but with this type of heater the heater provides a ready receptacle for liquids and trash and dirt from the occupant's shoes. Any foreign matter of this type upon coming into contact with the hot pipes of the heater produces undesirable odors which readily pass up into the interior of the automobile with the hot air passing through the grating which forms the cover of this type of heater. My heater cover is designed to eliminate the possibility of foreign matter of this character from passing into the interior of the heater thus eliminating the necessity of frequently cleaning out the heater and thus the heat passing through the slots 7 is absolutely odorless. This heater cover also takes the place of the usual foot rail and forms a permanent fixture for the interior of the automobile.

From the foregoing description it becomes evident that the device is very simple and efficient in operation, cannot get out of order, prevents foreign matter from passing into the heater and provides a device which accomplishes the objects described.

Having thus fully described my invention, its utility and mode of operation, what I claim and desire to secure by Letters Patent of the United States is—

1. An automobile heater cover comprising a casing formed to provide a multiplicity of bosses arranged in rows on the opposite sides of the casing, the bosses of the different rows being arranged in staggered relation and each being provided with a vertical face having an opening therethrough, and a flange formed integrally with the casing and adapted for attachment over an opening.

2. An automobile heater cover comprising a casing formed to provied a series of bosses each having a vertical face, each boss being provided with an opening through the vertical face thereof, and a flange about the edge of the casing adapted for attachment to a floor about a heater opening.

3. An automobile heater cover comprising a casing formed to provide a series of bosses each having a vertical face, each boss being provided with a slot opening through the vertical face thereof.

4. An automobile heater cover comprising a casing having side walls positioned at an angle to the vertical and provided with a multiplicity of portions having substantially vertical faces, each vertical face being provided with an opening to the interior of the casing.

5. An automobile heater cover comprising a casing having a peripheral flange providing a base for attachment to a surface to occupy a substantially horizontal plane, the casing having side walls extending upwardly in converging relation from the side of the base and merging at a point substantially centrally above the base providing a hollow interior opening through the flange, the said side walls both being provided with a plurality of apertured vertical faces.

6. An automobile heater cover comprising a metal casing of hollow form open on one side and adapted for attachment to a surface in a horizontal plane, said casing having side walls merging at the center above the opening and formed with a plurality of recesses in the inner surface providing bosses on the exterior surfaces, said bosses having vertical faces provided with slots therein of a depth in excess of the thickness of the metal, the upper surface of the said bosses lying at an angle to the vertical and overlying the apertures shielding the same from ingress of material falling on the surface of the casing.

In testimony whereof I sign this specification.

EMMET P. GRAY.